US005828883A

United States Patent [19]
Hall

[11] Patent Number: 5,828,883
[45] Date of Patent: Oct. 27, 1998

[54] CALL PATH REFINEMENT PROFILES

[75] Inventor: Robert J. Hall, Berkeley Heights, N.J.

[73] Assignee: Lucent Technologies, Inc., Murray Hill, N.J.

[21] Appl. No.: 535,433

[22] Filed: Sep. 27, 1995

Related U.S. Application Data

[63] Continuation-in-part of Ser. No. 221,228, Mar. 31, 1994, abandoned.

[51] Int. Cl.$^6$ .......................................................... G06F 9/44
[52] U.S. Cl. ............................................ 395/704; 395/709
[58] Field of Search ...................................... 395/704, 709, 395/783.14

[56] References Cited

U.S. PATENT DOCUMENTS

| | | | |
|---|---|---|---|
| 5,355,487 | 10/1994 | Keller et al. ............................... | 395/650 |
| 5,408,650 | 4/1995 | Arsenault .................................. | 395/575 |
| 5,530,964 | 6/1996 | Alpert et al. .............................. | 395/700 |

OTHER PUBLICATIONS

"Using Profile Information to Assist Classic Code Optimizations", Chang et al., Soft. Prac. and Experience, vol. 21(12), Dec. 1991, pp. 1301–1321.

"Predicting Program Behavior Using Real or Estimated Profiles", David W. Wall, Proc. of the ACM SIGPLAN 1991, pp. 59–70.

"An Execution Profiler for Modular Programs", Graham et al., Soft. Practice & Experience, vol. 13, 1983, pp. 671–685.

"Call Path Profiling", Robert J. Hall, Proc. 14$^{th}$ Int'l Conf. Soft. Engineering, ACM, 1992, pp. 296–306.

*Primary Examiner*—Emanuel Todd Voeltz
*Assistant Examiner*—Kakali Chaki

[57] ABSTRACT

A method and system for measuring the usage of a focus resource by a target program which has a plurality of call paths and at least one procedure, which allows a user to select a focus call path from a call path profile and compute a refinement call path profile which shows the usage of the focus resource by refinement call paths of the focus call path. Methods and systems are disclosed for deriving the call path profile, pruning and unpruning the call path profile, defining function groups, optimizing and contextualizing. Computation of the refinement call path profile can be performed by immediate upward or downward and extended upward or downward refinement of the call path profile.

40 Claims, 15 Drawing Sheets

STACK TREE FOR FORMS-PROCESSING PROGRAM

FIG. 2

| | Function Profile for resource: Real Time 614 samples, sampled every 20 gticks format: usage_fraction function_name #raw_samples | |
|---|---|---|
| RESOURCE USAGE FRACTION | PROCEDURE NAME | # OF SAMPLES |
| 1.0000 | main | 614 |
| 1.0000 | db_read_record | 614 |
| 0.8632 | db_get_attribute | 530 |
| 0.6873 | address_information | 422 |
| 0.1743 | invoice | 107 |
| 0.1726 | form_US_1040 | 106 |
| 0.1726 | credit card application | 106 |
| 0.1726 | loan_application | 106 |
| 0.1710 | form_NJ_1040 | 105 |
| 0.1368 | db_update_record | 84 |

FIG. 3

| | Upward Call Path Profile for Resource: Real Time<br>614 samples, sampled every 20 gticks<br>format: usage_fraction call_path #raw_samples | |
|---|---|---|
| RESOURCE USAGE FRACTION | PROCEDURE NAME | NUMBER OF SAMPLES |
| 1.0000 | db_read_record | 614 |
| 0.8632 | db_get_attribute db_read_record | 530 |
| 0.6873 | address_information db_get_attribute db_read_record | 422 |
| 0.1384 | envelope address_information db_get_attribute db_read_record | 85 |
| 0.1384 | invoice address_information db_get_attribute db_read_record | 85 |

FIG. 4

| | Downward Call Path Profile for resource: Real Time 2676 samples, sampled every 50 gticks | |
|---|---|---|
| RESOURCE USAGE FRACTION | PROCEDURE NAME | # OF SAMPLES |
| 1.0000 | main | 2676 |
| 0.88004 | main uniquify_db | 2355 |
| 0.68012 | main uniquify_db qsort | 1820 |
| 0.11323 | main print_salary_list | 303 |
| 0.11323 | main print_salary_list extract_salary_fields | 303 |
| 0.00000 | main print_salary_list qsort | 0 |

FIG. 5

| | Downward Call Path Profile for resource: Page Faults 9950 samples, sampled every 10 gticks | |
|---|---|---|
| RESOURCE USAGE FRACTION | PROCEDURE NAME | # OF SAMPLES |
| 0.99889 | main | 9939 |
| 0.71317 | main uniquify_db | 7096 |
| 0.56995 | main uniquify_db qsort | 5671 |
| 0.13467 | main print_salary_list | 1340 |
| 0.13457 | main print_salary_list extract_salary_fields | 1339 |
| 0.00000 | main print_salary_list qsort | 0 |

FIG. 6
| Upward Call Path Profile for Resource: Real Time | | |
|---|---|---|
| RESOURCE USAGE FRACTION | PROCEDURE NAME | NUMBER OF SAMPLES |
| 0.273333 | copy | 8200 |
| 0.273333 | sort copy | 8200 |
| 0.273333 | main sort copy | 8200 |
| 0.273333 | start main sort copy | 8200 |
| 0.260000 | sort sort copy | 7800 |
FIG. 7A
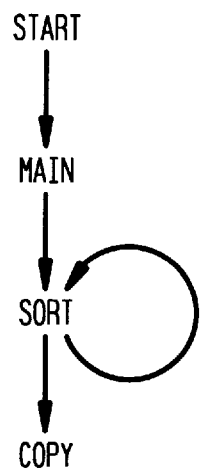
FIG. 7B
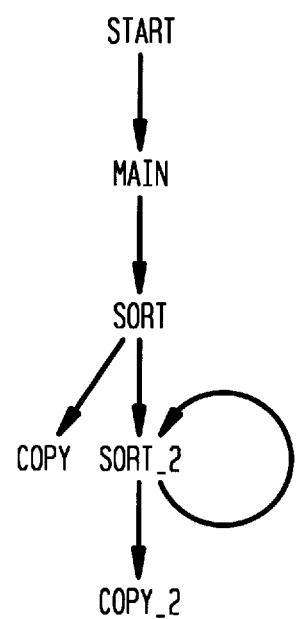

FIG. 14

```
;;;Immediate, Downward Refinement Profile of
;;;(PROCESS-INSTANTIATE), which costs 0.571
;;;--------------------------
;  0.429  (PROCESS-INSTANTIATE LOAD-MODEL)
;  0.143  (PROCESS-INSTANTIATE INSTANTIATE-MODEL)
;;;--------------------------
;;;       (this is all non-zero entries)
```

FIG. 15

```
;;;Immediate, Downward Refinement Profile of
;;;    (PROCESS-INSTANTIATE LOAD-MODEL CLEAR-ISAT
;;;    DECLARATIONS), which costs 0.381
;;;--------------------------
;  0.381  (PROCESS-INSTANTIATE LOAD-MODEL CLEAR-ISAT-
;;;        DECLARATIONS INSTALL-BUILTIN-KNOWLEDGE)
;;;--------------------------
;;;       (this is all non-zero entries)
```

FIG. 16

```
;;;Extended, Downward Refinement Profile of
;;;    (PROCESS-INSTANTIATE LOAD-MODEL CLEAR-ISAT-
;;;    DECLARATIONS INSTALL-BUILTIN-KNOWLEDGE),
;;;    which costs 0.381
;;; --------------------------
;  0.381    (PROCESS-INSTANTIATE LOAD-MODEL CLEAR-ISAT-
;;;          DECLARATIONS INSTALL-BUILTIN-KNOWLEDGE...
;;;          COMPILE)
;  0.381    (PROCESS-INSTANTIATE LOAD-MODEL CLEAR-ISAT-
;;;          DECLARATIONS INSTALL-BUILTIN-KNOWLEDGE...
;;;          PROCESS-DESIMPLIFIER)
;  0.381    (PROCESS-INSTANTIATE LOAD-MODEL CLEAR-ISAT-
;;;          DECLARATIONS INSTALL-BUILTIN-KNOWLEDGE...
;;;          EVAL)
etc.
;  0.333    (PROCESS-INSTANTIATE LOAD-MODEL CLEAR-ISAT-
;;;          DECLARATIONS INSTALL-BUILTIN-KNOWLEDGE...

;;;          <compiler internal function>)
etc.
;;; --------------------------
```

FIG. 17

```
;;;Extended Downward Refinement Profile of
;;;(), which costs 1.000
;;;---------------------------
;   1.000  (funcall)
;   1.000  (apply)
;   1.000  (EVAL)
;   1.000  (LOAD-MODEL)
;   0.905  (COMPILE)
;   0.714  (PROGN)
;   0.714  (PROCESS-DEFMODEL-FORM)
;;;---------------------------
;;;suppressed 133 entries, each using ≤ 0.7
```

FIG. 18

```
;;;Extended Upward Refinement Profile of
;;;(COMPILE), which costs 0.905
;;;---------------------------
;   0.905(LOAD-MODEL              ...COMPILE)
;   0.905(EVAL                    ...COMPILE)
;   0.905(apply                   ...COMPILE)
;   0.905(funcall                 ...COMPILE)
;   0.667(CLEAR-ISAT-DECLARATIONS  ...COMPILE)
;   0.667(INSTALL-BUILTIN-KNOWLEDGE ...COMPILE)
;   0.619(PROGN                   ...COMPILE)
;   0.619(PROCESS-DESIMPLIFIER    ...COMPILE)
;   0.476(PROCESS-INSTANTIATE     ...COMPILE)
;;;---------------------------
;;;suppressed 16 entries, each using ≤ 0.2
```

FIG. 19

```
;;;Immediate, Upward Refinement Profile of
;;;   (LOAD-MODEL CLEAR ISAT-DECLARATIONS
;;;    INSTALL-BUILTIN-KNOWLEDGE...COMPILE),
;;;   which costs 0.667
;;;---------------------------
;   0.3812    (PROCESS-INSTANTIATE LOAD MODEL
;;;            CLEAR-ISAT-DECLARATIONS
;;;            INSTALL-BUILTIN-KNOWLEDGE...COMPILE)
;;;---------------------------
;;;(this is all non-zero entries)
```

FIG. 20

Procedure ADD-TRACE (STACK-TRACE, COST, NODE)
    (Add the cost for (nonempty) STACK-TRACE to stack tree NODE)
    If *nonempty?*(*rest*(STACK-TRACE))
        Then ADD-TRACE(*rest*(STACK-TRACE),
                       COST,
                       FIND-OR-MAKE-CHILD(NODE, *first*(STACK-TRACE)))
        Else Add COST to *weight*(NODE)

FIG. 21

Procedure MAP-CP (T, P, MAP-FN)
(Apply MAP-FN to each maximal node of stack-tree T in the denotation of call path P.)
If P ≠ ()
    Then If *label*(T) = *first*(P)
        Then If *rest*(P) ≠ ()
            Then Let EXPECTED-CALLEE be *second*(P)
                If EXPECTED-CALLEE = ELLIPSIS
                    Then For each child CH of T
                        MAP-CP (CH,*rest*(*rest*(P)),MAP-FN)
                  Else For each child CH of T
                      If *label*(CH) = EXPECTED-CALLEE
                          Then MAP-CP(CH,*rest*(P), MAP-FN)
                          Else MAP-CP(CH,P, MAP-FN)
            Else Call MAP-FN(T)
        Else For each child CH of T
            MAP-CP(CH,P, MAP-FN)
    Else Call MAP-FN(T)

FIG. 22

Global Variable SUM

Procedure COST (P,T)
    (Returns total cost of call path P in stack tree T)
    Set SUM to 0
    MAP-CP (T, P, ACCUMULATE-WEIGHTS)
    Return SUM Procedure ACCUMULATE-WEIGHTS (NODE)
    Add *weight*(NODE) to SUM

FIG. 23

Global Variable REQUIRED-PARENT-LABEL

Procedure REF (T,P,EXTENDED?)
    (Builds refinement profile for call path P in tree T)
    *init-function-records()*
    If either EXTENDED? or P=()
        Then MAP-CP (T, P, EXTENDED-MAP-FUNCTION)
        Else MAP-CP (T, P, IMMEDIATE-MAP-FUNCTION)
    Return *function-records-to-profile* (P, EXTENDED?)

Procedure EXTENDED-MAP-FUNCTION (NODE)
    For each child CH of NODE:
        FUNCTION-COSTS (CH-NIL)

Procedure IMMEDIATE-MAP-FUNCTION (NODE)
    Set REQUIRED-PARENT-LABEL to *label*(NODE)
    For each child CH of NODE:
        FUNCTION-COSTS(CH-NODE)

FIG. 24

```
Procedure FUNCTION-COSTS (NODE, PARENT)
    (Compute function costs for each node with desired parent)

If either PARENT=NIL or label(PARENT)=REQUIRED-PARENT-LABEL
            Then Let LABEL be label(NODE)
                Let UNLOCKED? be unlocked?(LABEL)
                If UNLOCKED?
                        Then increment score of LABEL by weight(NODE)
                set-unlocked-state(LABEL, FALSE)
                For each child CH of NODE
                        FUNCTION-COSTS(CH,if PARENT ≠ NIL then
                                                    NODE else NIL)
                    set-unlocked-state(LABEL, UNLOCKED?)
            Else For each child CH of NODE
                        FUNCTION-COSTS(CH, NODE)
```

CALL PATH REFINEMENT PROFILES

CROSS-REFERENCE TO RELATED APPLICATIONS

This application is a continuation-in-part of application Ser. No. 08/221,228, filed, Mar. 31, 1994, now abandoned.

TECHNICAL FIELD

This invention relates to software programs, and more particularly to a method and a system for measuring performance of and optimizing software programs.

BACKGROUND OF THE INVENTION

Complex software programs or applications are typically designed in a layered fashion, involving many levels of functions or procedure calls. In these programs, the number of ancestor (parent) procedures calling a sequence of descendant (children and their progeny) procedures can be quite large. In order to manage the resources devoted to the design and development of these complex programs, various techniques have been devised to increase the reliability and speed of development of such programs. Some of the best-known techniques include software reuse, layering (mentioned above) and recursion (e.g., breaking a problem into smaller instances of itself).

General software components are reused in as many specific contexts as possible, in order to increase reliability and to speed development. Recursion may be used when a problem can be solved by reducing it to smaller instances of the same problem. Layering, reuse, and recursion techniques, however, can lead to inefficiency when the specific context in which a component is used does not require the full generality of the component.

More specifically, one of the drawbacks of these techniques is that designers and coders who devise programs that reuse existing general software components are bound by critical design and coding decisions made by the developer(s) of the general software components being reused. Those design and coding decisions, which are typically predicated on ease of reuse, may cause significant inefficiency in resource use for specific applications. This inefficiency takes particular significance for certain applications in which resources, such as cycle time and/or memory utilization, are critical. Yet, the benefits of software reuse are too significant to forego even for these resource critical applications.

For example, reusing a module implementing the fully general Set data type in a situation where only a few Set properties are required is likely to be suboptimal, because many restrictions of Set have specialized optimal representations: disjoint-set representations for union-find tasks, bit vectors for small-universe sets, and hash tables for add/delete-intensive tasks operating on large sets. Moreover, distinct uses of such a component within a program may depend on distinct subsets of the component's full generality.

Many optimization techniques speed up a program by specializing the implementation of a component using properties peculiar to its use-context. That is, one creates a specialized version of the component and ensures that it is only called within the context enabling the optimization, possibly by specializing the call ancestors of the component as well. (Other uses of the component still call the original version.) While this technique is effective, it also makes programs hard to understand and maintain. Consequently, such optimization should be limited only to those contextualized component uses that are critical to the program's performance. Discovering these "bottlenecks" through code inspection alone is difficult and error-prone, so programmers need tools to aid in this discovery task.

Techniques have been devised for directly measuring programs' resource usage (also called "costs") of certain functions or procedures used in a program to aid in discovering program bottlenecks.

One such prior art technique is the profiling solution that is embodied in the "Prof" command of the UNIX® operating system. Prof only reports the amount of resources consumed within the internal structure of a particular procedure. Hence, Prof does not provide programmers with adequate information to localize performance bottlenecks in their program.

Another prior art technique displays, for each procedure, the fraction of the total time spent executing that procedure and its called descendants. Such a technique, unfortunately, provides limited guidance for optimization of complex programs because different call contexts enable different optimizations. Furthermore, no mechanism is provided in this technique to gauge the amount of time spent in a procedure on behalf of particular callers.

Another type of profile, that is partly implemented, for example, in the UNIX® gprof command, remedies some of the limitations of the aforementioned techniques by providing the cost incurred by a procedure on behalf of each of its immediate callers. The gprof-style profile, however, provides information only for a calling procedure and its immediate called procedure. This offers only limited guidance, at best, to designers of complex layered programs who need more than parent/child cost information for procedures when investigating the performance of those programs.

Consideration has also been given to a technique which traces classes of resource utilization specified by a user. The technique of tracing generates a large amount of data that is not organized nor summarized in a systematic fashion to enable programmers to pinpoint specific inefficient procedures, calls or subroutines, to aid them in optimizing code.

Other techniques, such as stack-tree profilers, have also been considered. Unfortunately, those techniques also provide inadequate information to pinpoint performance bottlenecks in software programs.

Thus, one problem encountered in prior art optimization techniques is the inadequacy of the information provided about resource utilization of contextualized procedures or subroutines which are critical to a program's performance. Not enough information is provided pinpointing where in the code a program is inefficient, nor is information offered as to the cause of the inefficiencies.

SUMMARY OF THE INVENTION

Disadvantages of the prior art resource usage measurement and optimization techniques, such as inadequacy of information regarding resource utilization, are overcome by the present invention.

The present invention teaches methods and systems for measuring usage of at least one focus resource by a target program which has a plurality of call paths and at least one procedure. One disclosed method and system comprises providing a call path profile containing a data list, in some predetermined order, of some subset, including a null set, of the plurality of call paths together with associated usage cost of said focus resource, selecting a focus call path from the call path profile or from the plurality of call paths, and computing a refinement call path profile showing the usage of the focus resource by refinement call paths of the focus call path. The focus resource can be selected from a plurality of monotonic computer resources.

In a preferred embodiment, features of the present invention include: definition of a function group from the call paths in the call path profile which allows grouping of the call paths from the data list as the focus call path and computing the refinement call path profile on the focus call path; deriving the call path profile by running the target program using a processor in a data collection phase during which information regarding usage of the focus resource is collected, by sampling or instrumentation, and the call path profile is containing the data list is computed; pruning to exclude some of data from the call path profile, or unpruning to restore some or all of excluded data and computing the refinement call path profile on the pruned or unpruned call path profile; an initial call path profile can be a function profile, where the function profile can be derived from refinement of an empty call path wherein all the procedures in said target program are identified along with their proportion of usage of the focus resource; the call path profile can be derived by selecting the focus resource from a plurality of monotonic computer resources, running the target program and collecting data regarding usage of the focus resource, then generating a stack tree and generating the call path profile from the stack tree; the computed refinement call path profile can be merged into a previously computed refinement call path profile so the resulting computed refinement call path profile contains both newly computed and previously computed information of usage costs; the usage costs data can be sorted; the refinement call path profiles, or some subset thereof, can also be displayed.

In another aspect, features of the present invention include: the extended refinement profile, invoked by a user via a unique switch with the user specifying the focus call path to be analyzed, which shows for each refinement call path, the focus resource usage along a summary of all call paths starting with the focus call path and ending with a procedure or function group; and the immediate refinement profile, invoked by a user via a unique switch with the call path to be analyzed indicated by the focus call path, which computes the focus resource usage one procedure or function group call level immediately upward or downward from the focus call path. The immediate and extended refinement profiles can be upward or downward relative to the focus call path. The immediate or extended upward refinement profiles allow that an initial call path profile can be a function profile, where the function profile can be derived by selecting the focus resource from a plurality of monotonic computer resources, running the target program and collecting data regarding usage of the focus resource, generating a stack tree and generating the function profile from the stack tree. The refinement call path profile is then computed by constructing a dual of the stack tree and computing the immediate or extended upward refinement call path profile from the dual stack tree.

In a preferred embodiment, software optimization is taught which provides for improving the performance of a target program having a plurality of call paths and at least one procedure. This improvement comprises providing a call path profile containing a data list, in some predetermined order, of some subset of the plurality of call paths together with associated usage costs of a focus resource. A focus call path is then selected from the call path profile or from the plurality of call paths. A refinement call path profile showing the usage of the focus resource by refinement call paths of said focus call path is computed. Bottleneck call paths are determined from usage shown in the refinement call path profile and the bottleneck call path is optimized by changing the code of the target program. This can be iteratively repeated to further improve efficiency of the target program until either (1) desired efficiency is reached, or (2) no further improvements in efficiency can be achieved. In optimizing, the target program is first modified wherein the procedures of the focus call path are rewritten into new procedure versions so that new procedure versions are only called within a context specified in the focus call path, and then, the new procedure versions are refined by further iteration.

BRIEF DESCRIPTION OF THE DRAWINGS

FIG. 2 is a function profile of the non-recursive program of FIG. 1A;

FIG. 3 is an upward call path profile of the non-recursive program of FIG. 1A that is derived in accordance with the principles of the invention;

FIGS. 4 and 5 show downward call path profiles of a non-recursive program for run time and page fault resources, respectively;

FIG. 6 is an upward call path profile of a recursive program that is derived in accordance with the principles of the invention;

FIGS. 7A and 7B show call graphs of the original and the optimized recursive program of FIG. 6;

FIG. 14 is an immediate, downward call path refinement profile of the length-1 call path of the ISAT example program of FIG. 12 derived according to the present invention;

FIG. 15 is a repeated immediate, downward refinement profile of the program of FIG. 12 derived according to the present invention;

FIG. 16 is an extended, downward refinement profile of a call path of the program of FIG. 12 derived according to the present invention;

FIG. 17 is an extended downward refinement profile of an empty call path (or function profile) for the program of FIG. 12 derived according to the present invention;

FIG. 18 is an extended, upward refinement profile of the length 1 call path (COMPILE) for the program of FIG. 12 derived according to the present invention;

FIG. 19 is an immediate, upward refinement profile of a particular call path of the program of FIG. 12 derived according to the present invention;

FIG. 20 presents one embodiment of the pseudo code definition for the ADD-TRACE routine according to the present invention;

FIG. 21 presents one embodiment of the pseudo code definition for the MAP-CP routine according to the present invention;

FIG. 22 presents one embodiment of the procedure COST for computing costs of a call path according to the present invention;

FIG. 23 presents one embodiment of the REF procedure for computing call path refinement profiles according to the present invention;

FIG. 24 presents one embodiment of the pseudo code definition for the FUNCTION-COSTS routine used by REF according to the present invention;

DETAILED DESCRIPTION

Call path refinement profiles according to the present invention, provide a novel technique to directly pinpoint performance bottlenecks in software programs. Call path refinement profiles according to the present invention, are implemented within the CPPROF profiling environment which is disclosed in co-pending application Ser. No. 08/221,228, filed Mar. 31, 1994 and which application is incorporated herein by reference.

Several definitions which will be helpful in facilitating an understanding of call path refinement profiles according to the present invention are provided. In this specification, the term "function" is used synonymously with "procedure" and "subroutine".

Figure 11:
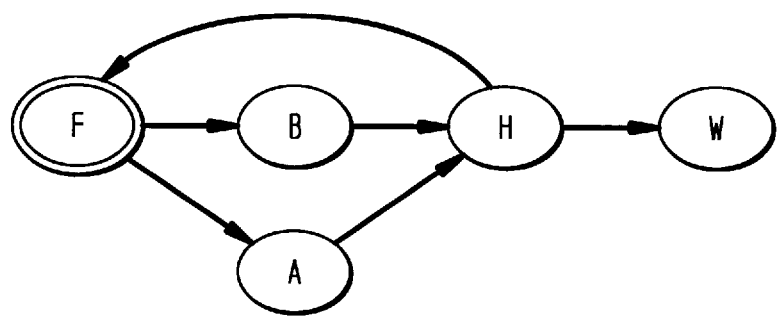
FIG. 11 is an abstracted call graph of the example program.

A stack trace of a program at any instant of time is the sequence of functions that are active at that time. This sequence always starts with the highest level (or "root") function, followed by the function called by the root, followed by the callee of that function, etc., ending with the function actually executing at that time. If the program is recursive, a function may appear more than once in a stack trace. As examples, the program of FIG. 11 has root functionf, and can have stack traces <f, a, h>, <f>, and <f, a, h, f, b, h, w> at different times, but not <w>.

A simple call path is a list of functions denoting a set of stack traces. The empty call path ( ) denotes all stack traces; (f) denotes all stack traces containing one or more appearances of f; $(f_j \ldots f_k)$, k>0, denotes all stack traces $<g_0 \ldots ,g_l>$ for which there exists a function m: [0, k-1] $\rightarrow$ [0, l-1] such that for all 0≦i<k, $g_{m(i)}=f_i$, $g_{m(i)+1}=f_{i+1}$ and m(i+1)>m(i).

A simple call path represents all stack traces that could be present when each of the calls from $f_i$ to $f_{i+1}$ is present (in order). The denotation of the call path (a h w) in FIG. 1 includes the traces <f, a, h, w> and <f, a, h, f, b, h, w>, but not <f, b, h, w >, because there is no call from a to h. For a simple call path p, D(p) can be defined to be the denotation of p as described above. A simple call path need not begin with the root function.

A call path is either a simple call path or $p_1$ @ ( . . . ) @ $p_2$, where $p_1$ and $p_2$ are (not necessarily simple) call paths, ". . . " is a special ellipsis symbol, and @ denotes list concatenation. The ellipsis symbol is three dots on the line, while the ellipsis meta-notation (used, e.g., in the definition of simple call path above) is three dots above the line. The denotation of the call path $p_1$ @ ( . . . ) @ $p_2$ provides a summary of call paths from $p_1$ to $p_2$ and is defined to be the union of the denotations of all call paths of the form $p_1$ @ s @ $p_2$ where s is a simple call path. In the example of FIG. 1, (f . . . h) denotes the union of the denotations of (f a h), (f b h), (f a h f b h), etc. There may be any number of ellipsis symbols in a call path.

The cost of a call path p during a particular run of the program is defined simply as the fraction of the program's run time that passed when some member of D(p) was the current stack trace. This definition is simply connected to the process of program optimization. For example, where the cost of call path (f b h) is 0.75 of the total time, an equivalent version of h, h', can be created that is called only from b', which in turn is called only from f (a still calls h). It can then be concluded that h' is executing 75% of the time of the run. Thus, barring interactions, the time of the run of the program can be reduced (i.e, the program can be made more efficient) by this amount through specializing h'. Costs of all simple call paths can similarly be interpreted in terms of corresponding specialized versions of the program. This scheme can be extended to call paths containing ellipses.

Figure 1A:
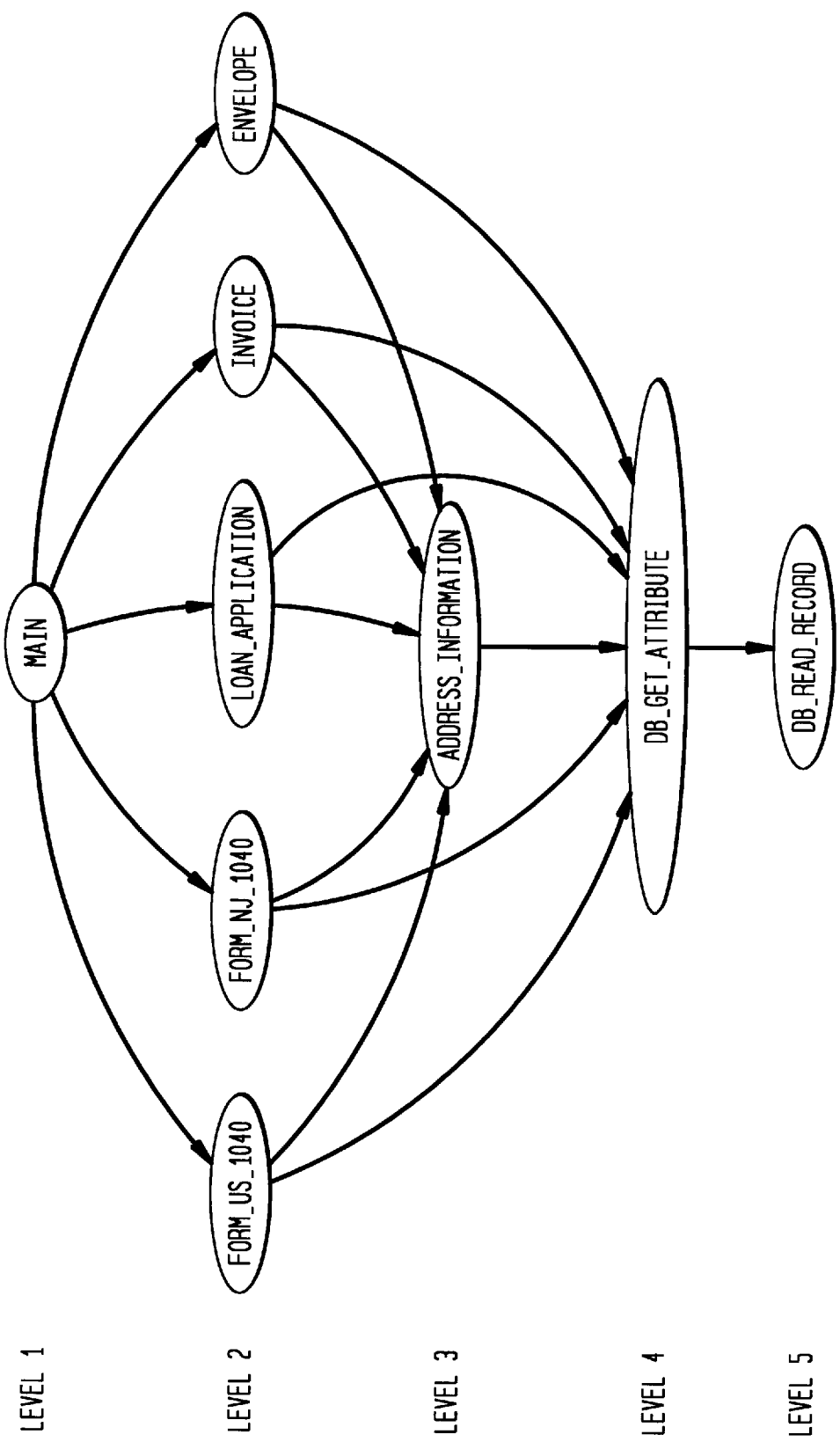
FIG. 1A is an illustrative representation of a non-recursive program.

FIG. 1A shows the most significant procedures of a forms program that fills out forms for users by looking up information in an on-line database. The program calls a specialized processing function for each type of form. The procedures in the program are arranged in an hierarchical order ranging from level 1 to level 5. The procedures at the second level call the utility procedure address_information at the third level that returns the coordinates of an individual in a database. Those coordinates include full name, address, telephone number, zip code etc. The "db_get_attribute" utility at the fourth level extracts an attribute, such as an address from a database entry. The "db_read_record" procedure at the fifth level performs a disk read to find the record for a given individual.

Figure 1B:
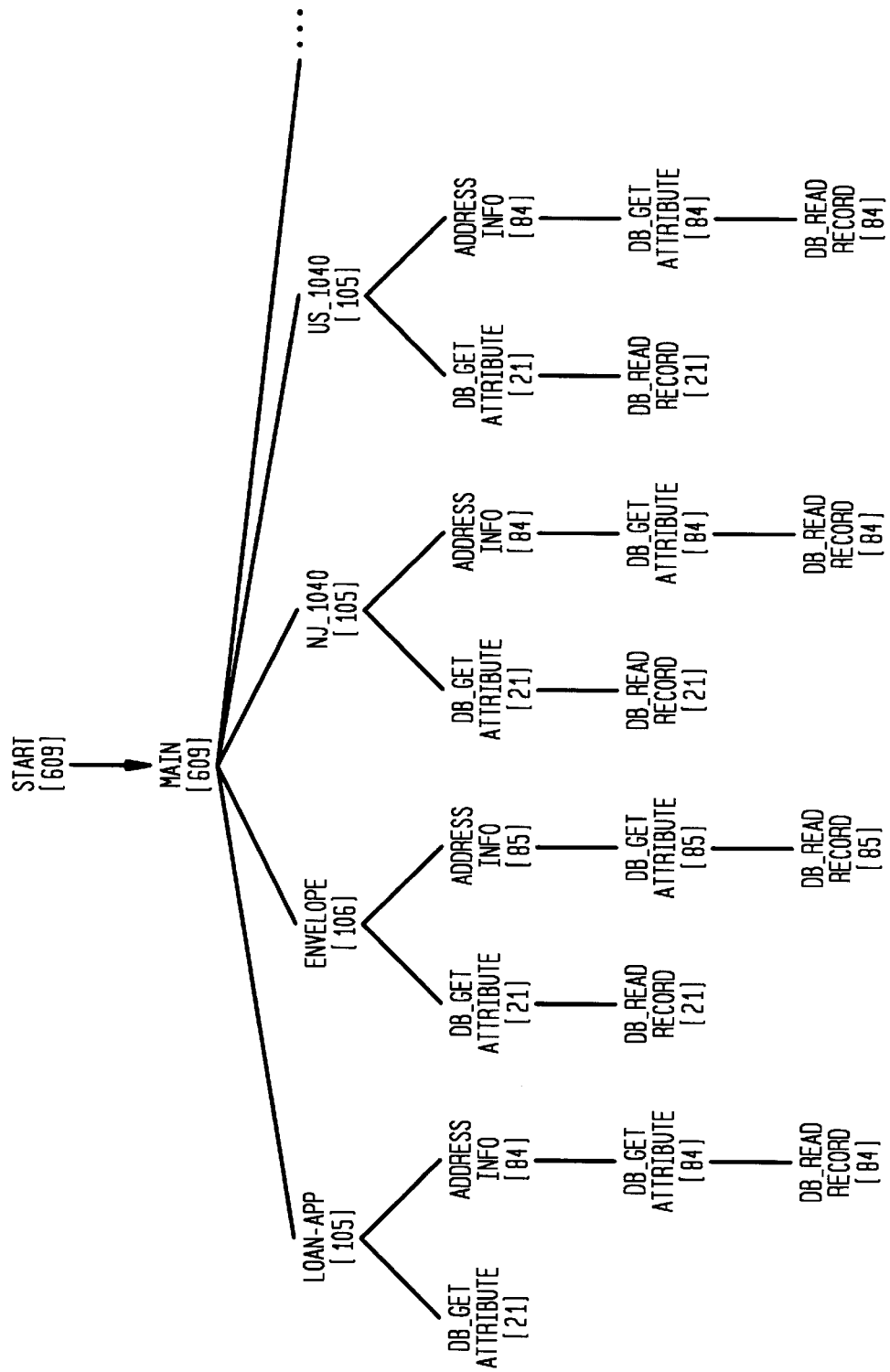
FIG. 1B is a stack tree of the non-recursive program of FIG. 1A.

FIG. 1B is a stack tree of the non-recursive program FIG. 1A. The stack tree of FIG. 1B is derived by implementing a monitor process that can be implemented for any language and in any operating system. The monitor process allows a user to a) specify a particular resource of interest, such as run time, page faults, traps, floating point exceptions and system calls, and b) receive a report on the number of resource units consumed by each procedure (or sequences of procedures, as described in further detail below) during the execution of the program. In particular, the monitor process occasionally halts the execution of the program to write to a file the program counter and the addresses of all procedures currently being executed each time a predetermined number of units of the user-designated resource is consumed. Thereafter, the return addresses are mapped to the respective names of the procedures. As an alternative to the aforementioned interrupt handler, data collection instructions can be inserted (either manually or automatically) in the source code of the program of FIG. 1A to record resource consumption for each nested sequence of procedures.

In this example, resources of interest are primarily resources whose total consumption for the execution of the program is equal to the sum of resource consumption in each individual procedure. Those resources called "monotonic resources" are defined as being of the type for which there is a measurement primitive, such as a clock, which returns a number proportional to the amount of the given resource that has been used since an arbitrary zero point. The amount of the resource used by a given program (or procedure) is then the difference between the clock value immediately after the program execution and the clock value immediately before the program execution, minus any overhead clock ticks caused by the calls to the clock itself.

In this example, resources are measured by a polymorphic unit, called a generalized tick, hereinafter called "gtick". A gtick may measure, for example, a hundredth of a second for run time resources, one page fault for text and data page faults, one byte for space allocation, to name a few.

From the mapped list of procedure names, the stack tree of FIG. 1B is built. The stack tree is an hierarchical arrangement of nodes, labelled by the names of the procedures. Associated with each node is a numerical field that stores the cost incurred by the procedure, when called by the sequence of ancestor procedures labelling the path from root to the node.

When the stack tree is built from sample data, individual samples are recorded in the tree by tracing an hierarchical path in the tree from a calling procedure to descendant procedures via intermediate levels in the hierarchy, if any. If no such path yet exists in the tree, new nodes are added in the tree to create that path. Once all samples are recorded in the tree, a resource consumption or cost figure is then attributed to each path, based on the number of times a given procedure and its descendant procedures appear in the samples. Those numbers are shown under each procedure name in the tree of FIG. 1B.

FIG. 2 is a function profile of the non-recursive program of FIG. 1A. In FIG. 2, the header information shows that the information associated with the function profile was collected by sampling Real Time once every twenty (20) generalized ticks (gtick). In other words, the monitor process halted the execution of the program every time two hundred (200) milliseconds of run time resources were consumed to report the addresses of the procedures that were being executed at the time of the interruption. Thereafter, the program counter and the return addresses of each procedure are analyzed to determine the sequence of calling and called procedures for each sample.

Shown in the leftmost column of FIG. 2 is a fraction of resources consumed during all invocations of each procedure in the program. The middle column represents the procedure name, while the rightmost column indicates the number of times a procedure address was recorded at the time of the interruption.

The function profile of FIG. 2 shows us that the most significant procedures in terms of resource consumption are "db_read_record", "db_get_attribute", and "address_information". Hence, the most significant efficiency gains (if there are any) are to be obtained in optimizable contexts within these procedures. In other words, a crude answer is provided to the question as to where the program may be inefficient.

FIG. 3 is an upward call path profile of the non-recursive program of FIG. 1A. The call path profile of FIG. 3 provides a direct connection between the nested sequences of procedures in the program and resource consumption, as measured by the reported number of sample hits. The call path profile of FIG. 3 is derived using data collected by the same monitoring process described above. Unlike the function profile of FIG. 2 in which only the address of each procedure was used to derive the profile, additional information is extracted from the sampling data to derive the call path profile of FIG. 3.

The stack tree of FIG. 1B is used to derive the call path profile of FIG. 3. In particular, the sum of each node's sample hits and those of all its called descendants is computed to derive the "weight" of each node that is used to derive the numbers shown on the rightmost column of FIG. 3. Each instance of a sequence of calling and called procedures is considered a sample hit. By tallying the number of sample hits for each call path, the numbers shown on the rightmost column of FIG. 3 are derived. As indicated above, those numbers represent the amount of units of resources needed for the execution of the sequences of procedures in the call path. As to the numbers shown in the leftmost column of FIG. 3, they represent fractions of the total amount of resources consumed during the run of the program. Call paths which consume less than 13% of the run time resources are not shown in FIG. 3. This is due to the fact that in this example, any profile entry whose usage fraction falls below a user-specifiable threshold is suppressed or filtered from the output of the sampling process. In this example, the filtering is based on a user-specifiable significance threshold of 13%. As a result, no call path is shown in FIG. 3 for form__US__1040 and form __NJ__1040. It is also possible for a call path to consume resources so insignificant that a zero can be shown in the rightmost column of FIG. 3. This can occur, for example, when the amount of resources needed for the sequences of procedures in the call path is less than one gtick. Additional information on an illustrative system and method that may be used to derive a call path profile is provided below.

In FIG. 3, the header information indicates that the profile is an upward call path profile. The latter is defined in terms of a particular procedure called the "focus" procedure. In FIG. 3, the focus procedure is the "db__read__record" procedure, but it can be any procedure in the program. Given such a user-selected focus procedure, an upward call path profile is a sorted, filtered list of the resource usages of all call paths whose last procedure name is the focus procedure. An upward call path profile provides a breakdown of which call ancestors of the focus procedure are consuming the most resources due to their execution. By contrast, a downward call path profile is simply a sorted, filtered list of the resource usages of all call paths whose first procedure name is the focus procedure. Although not shown in FIG. 3, downward profiles provide a hierarchical breakdown of resource consumed during the execution of the focus procedure.

Advantageously, when one knows that a program is spending most of its time in, say, memory allocation, an upward call path profile provides insights into the particular calls within the program that consume the most resources. For example, the first three call paths in FIG. 3 represent optimizable contexts because of the great amount of resources consumed in these call paths. Additionally, it can be observed that each one of these call paths end with a call to "db__read__record". Examination of the source code reveals that the procedure "address information" calls the procedure "db__get__attribute" four times to retrieve four fields of the same database entry. This results in four successive disk reads of the same record. By specializing the procedure "db__get__attribute" for use only within address information (to cache the record after the first read), 75% of the 0.6873 total run time fraction, can be saved, thereby reducing the overall run time by about 51%. It is worth noting that "db__get__attribute" procedure itself could not simply be optimized because other calls to that procedure (from outside of address information) require its full generality.

It is not always possible to readily identify performance bottlenecks in a program based on the call path profile derived by sampling just one resource.

FIGS. 4 and 5 show call path profiles of a different non-recursive program for run time and page fault resources, respectively. FIG. 4 and 5 are included in this example to show how call path profiling of a program (for different resources) provides a unique combination of highly detailed "where" descriptions (of performance bottleneck) with a rich variety of "why" explanations of those performance bottlenecks. The call path profile of FIGS. 4 and 5 are derived using the same techniques described above for deriving the call graph profile of FIG. 3. The program whose call paths are profiled in FIGS. 4 and 5 can be written as follows in the C programming language:

```
main ( )
{       DB db = read_db( );
        print_salary_state(uniquify_db(db));}
DB_RECORD **uniquify_db(DB db)
{       DB_RECORD **dbptrs = build_db_ptrs(db);
        qsort(dbptrs, name_field_lt);
        merge_adjacent_records( );
        return(dbptrs);}
print_salary_state(DB_RECORD **dbptrs)
{       int *salaries = extract_slaries( );
        qsort(salaries, integer_lt);
        stat_summary(salaries);}
```

Essentially, the program reads a database of employee records, sorts them in alphabetical order (for the name field) eliminating duplicate records, and then extracts and sorts the salaries. Finally, it prints various statistics about them, such as range, median, etc. Of particular importance in the program is the fact that the database is not sorted directly because this would force qsort to swap all the bytes of the records. Accordingly, the "uniquify_db" procedure creates, manipulates, and returns an array of pointers to database records. The call path profiles of FIGS. 4 and 5 are predicated on the assumption that the program is executed on a database too large to fit in the physical memory of the computer.

An analysis of the call path profile of FIG. 4 reveals that when the "main" procedure calls the "uniquify_db" procedure, which in turn calls the "qsort" procedure, 68% of the run-time resources are consumed. By contrast, in the other call to the "qsort" procedure from the "print_salary_list" procedure, insignificant run time resource is consumed (less resource than 1 gtick). Because the difference in resource consumption for the same qsort procedure is directly related to an optimizable context, one skilled in the art can easily change the program to call a specialized "qsort" procedure within a specialized "uniquify_db" procedure within the "main" procedure.

While the call path profile information in FIG. 4 is informative, it does not address the question as to how to specialize the "qsort" procedure in this case. This question is further complicated by the fact that the arrays sorted by the two "qsort" calls have approximately the same number of elements (assuming few duplications in the database).

The call path profile of FIG. 5 sheds some light as to why the measurements for the two sort calls are so anomalous. In particular, the third row of FIG. 5 shows that during the execution of the first "qsort" procedure, the array to be sorted resides on so many different pages that they could not be held in memory at once, causing a superlinear number of data page faults (due to the superlinear number of key comparisons required by sorting, where each key comparison must actually touch the page to get the name field).

Armed with this information, one skilled in the art can immediately focus on optimizing the critical performance bottleneck. Since the sort key fields are small, the program could localize the keys first (incurring only linearly many page faults) and then sort without causing further page faults. By optimizing the "uniquify_db" procedure in this fashion, the total run time for the program can be significantly reduced. It is worth noting that this optimization process is unnecessary for the call to the qsort procedure within the "print_salary_list" procedure, because the salaries are localized when they are extracted into a separate array.

FIG. 6 shows an illustrative example of an upward call path profile of the recursive program shown below.

```
/**********************************************/
/**********************************************/
/**********************************************/
/* Sort and Subroutines */
/* Destructively breaks the input list after n elements, and returns a
pointer
        to the start of the second part */
LIST split (x, n)
LIST x;
int n;
{
        if (n==0){
                return (x);
        } else {
                LIST trail = x;
                for (;((n>1)&&(trail)); n--) {
                        trail = (trail->next);
                }
                if (trail) {
                        LIST result = (trail->next);
                        (trail->next) = NIL;
                        return(result);
                } else {
                        return(NIL);
                }
        }
}
struct cell header;
/* Destructively merges the two input sorted lists into one big sorted list
*/
LIST merge (a, b, less_than)
LIST a;
LIST b;
int (*less_than)( );
{
        LIST tail = (&header);
        header.next = NIL;
        while(1) {
                if(!a){
                        (tail->next) = b;
                        break;
                }
                if (!b){
                        (tail->next) = a;
                        break;
                }
                if ((*less_than)(a, b)) {
                        (tail->next) = a;
                        tail = a;
                        a = (a->next);
                } else {
                        (tail->next) = b;
                        tail = b;
                        b = (b->next);
                }
        }
        return(header.next);
}
/* Recursively merge sort the input list according to the order predicate */
LIST sort (a, less_than)
LIST a;
int (*less_than)( );
{
        LIST left = copy(a);
        int lnth = length(left);
        if (lnth < 2) {
        return(left);
        } else {
                LIST right = split (left, lnth/2);
                left = sort (left, less_than);
```

-continued

```
        right = sort (right, less_than);
        return(merge(left, right, less_than));
    }
}
/**********************************************************/
/**********************************************************/
/**********************************************************/
/* A main routine */
int
main(argc, argv)
int argc;
char **argv;
{
    LIST input;
    LIST result;
    int print_p = 0;
    if ((argc != 2)&&(argc != 3)){
        (void) printf("Usage: sort-ex <numbers> [<print?>]\n");
        return(1);
    }
    input = build_random_list(atoi(argv[1]));
    if (argc == 3) {
        print_p = atoi(argv[2]);
    }
    if (print_p) {
        (void) printf("Sorting length %d list:\n", length(input));
        print_list(input);
    }else{
        (void) printf("Done making input, sorting . . . \n");
    }
    result = sort(input, data_lt);
    if (print_p) {
        (void) printf("\nResult is length %d list:\n", length(result));
        print_list(result);
    }
    return(0);
}
```

Essentially, the program a) splits a linked list into two sections b) sorts recursively and non-destructively each section, and c) merges the two sorted linked lists into a single list that is thereafter sorted. The call path profile of FIG. 6 is derived from a stack tree built according to the principles described above. From the call path profile of FIG. 6, it can be noticed that while the second call path consumes 27.3% of the total amount of user designated resource, the fifth call path consumes 26% of the total amount of the user-designated resource. It can be logically inferred that the copying done within the recursive calls to the sort procedure is at the root cause of the excessive amount of resources consumed in the fifth call path. This conclusion is based on the fact that other calls to the copy procedure from the sort procedure consume an insignificant amount of the user-designated resource (1.3%).

FIG. 7A shows a call graph of the sort program shown above, while FIG. 7B shows a call graph of the same sort program after it has been optimized. Since copies made as a result of the recursive calls to the sort procedure have been identified as a performance bottleneck, optimization of the copy procedure (copy-2) within the context of the recursive calls of the sort procedure, lead to the call graph shown in FIG. 7B. It is worth noting that the recursive calls to sort are identified in the optimized call graph of FIG. 7B as sort-2. This is done to insure the procedure copy-2 is called for recursive instances, instead of the procedure copy. Of particular significance is the fact that the original procedure copy is not changed when that procedure is caller by sort, instead of sort-2. It would be appreciated that copy-2 performs no copying and simply returns it input. Alternatively, the call to copy-2 can be removed altogether.

Figure 8:
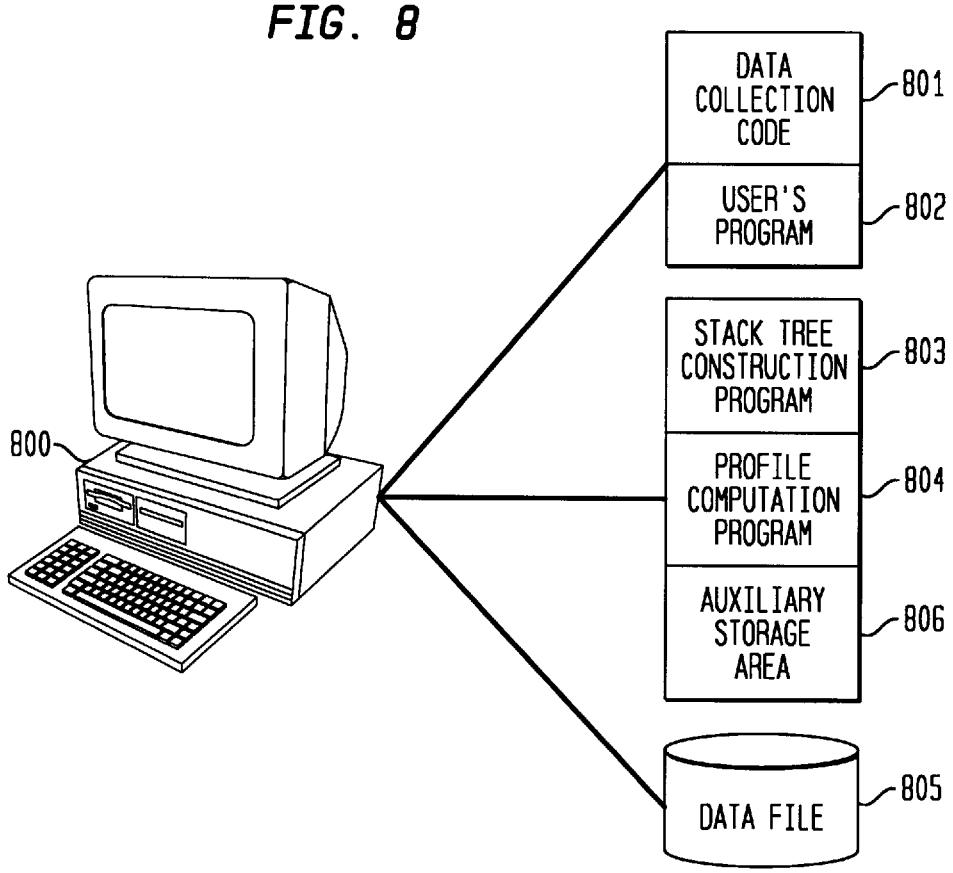
FIG. 8 shows a workstation in which, illustratively, the principles of an embodiment of the present invention may be implemented, and which includes a Direct Access Storage Device which contains file space, main memory, and instructions to derive the stack tree of FIG. 1B and the call path profiles illustrated in FIGS. 3, 4, 5, and 6.

FIG. 8 shows a workstation comprised of a Direct Access Storage Device which contains file space, main memory, and instructions to derive the stack tree of FIG. 1 and the call path profiles illustrated in FIGS. 3, 4, 5 and 6.

Workstation 800, which may be implemented using, for example, a SUN® workstation includes a SUN® display monitor and a keyboard that can be used to display pre-stored data or to specify parameters for program execution. Memory space is allocated by workstation 800 immediately before the execution of instructions associated with data code 801, user's program 802, stack tree construction program 803, profile computation program 804. Memory space for Scratch-pad-type of use is also allocated to auxiliary storage area 806. Accordingly, the aforementioned elements are represented as memory maps in FIG. 8, while data file 805 is represented as disk space.

Data collection code 801 comprises instructions that are included in, or linked to, the source code of use's program 802 to periodically interrupt execution of the user's program 802 to write the number of gtick used to data file 805. User's program 802 which contains the code whose performance bottlenecks are being identified, is arranged to call data collection code 801 to set up the interrupts.

Stack tree construction program 803 stores a set of instructions whose execution in a processor causes a stack sample to be built. In this example, when more gticks pass than a single sample boundary, the instructions cause a corresponding number of hits to be credited to the sample. This process of interrupting the program execution and recording sample hits continue until all the sampling records have been processed. Then, a stack sample is formed from the list of a) the number of sample hits, b) the current program counter, c) the return address of the current stack frame, and d) the return address of the caller and of the caller's caller, etc., until the root procedure is reached. A nested sequence of calling and called procedures is derived by analyzing the program counter and return addresses and mapping them to their corresponding procedure names. Therefore, instructions in the stack tree construction program 803 a) trace for each procedure hierarchial path of calling and called procedures up to the root of the program, and b) assigns cost consumption to each path based on the number of times a sequence of calling and called procedures within a path appear in the samples.

Profile computation program 804 stores the instructions needed to derive a call path profile. An exemplary set of such instructions that may be used to derive a downward call path profile is shown in the Appendix. The appendix presents pseudo-code for instructions to derive downward call path profiles from a previously constructed sample tree. Those instructions work for arbitrarily recursive programs and for arbitrary choice of focus procedure by the user. Included in profile computation program 804 is a separate output routine that takes the output of those instructions and formats the output for readability. In particular, the routine divides the number of sample hits in each call path's profile entry by the total number of sample hits incurred during the run in order to report a resource usage fraction. The instructions are designed to recursively descend the sample tree and associate each node with a canonical call path that represents that node. Then, the weight of the node is added to the gticks field of that call path's record, unless the record is locked.

Even though the instructions shown in the Appendix are designed to derive a downward call path profile, minor changes can be made to the stack tree construction program 803 to build an inverted stack tree, thereby allowing an upward call path profile to be derived, as shown, for example in FIG. 3.

Included in the profile computation program 804 are instructions that avoid attributing multiple times the same gticks to a given call path. Also, the program excludes from a downward call path profile all call paths in which a particular procedure name appears more than once in a sequence of procedures and other procedures follow the second appearance of that particular procedure within that sequence. Similarly, the program excludes from an upward call path profile all call paths in which any procedure name appears more than once and whose first appearance is preceded by one or more procedures.

The profile computation program 804 also includes user interface management instructions that allow the user to a) specify via the keyboard of processor 800, for example, the type of profile desired b) identify the desired focus procedure and c) set the threshold of resource consumption for the call paths to be included in the profile. Instructions for the display of the derived call path profile on the monitor of workstation 800 are also included in the profile computation program 804. Derived stack trees and call path profiles can be stored in auxiliary storage area 806.

It would be appreciated that the process of analyzing a call path profile can be divorced from the process of collecting data during the run of the user's program. These two processes can be carried out in separate computers as long as the data file 805 is transferred from one computer to the other.

Call path refinement profiles of the present invention provide an alternative method for optimizing usage of computer resources through software program optimization. Call path refinement profiles are effective tools for analyzing complex programs, and are equally effective for simpler programs. Call path refinement profiles yield detailed and accurate performance information about arbitrarily nested function call sequences, allowing one to tease apart the costs of a component in different call contexts, permitting more precise optimization of the bottlenecks or inefficiencies.

The need for looking at deeper call contexts than just single functions arises naturally in complex programs. A typical example is where a utility function, such as a memory allocator, is called by a library routine, such as MAKE-INSTANCE, which in turn is called at several points in the user's code. The utility routine will itself be called from many different sites as well. If, for example, it is determined that significant time is spent allocating memory for instances created at a certain call site (such as when instantiating a particular class C), it may be possible to use a faster, specialized memory allocator for this purpose in this context.

Call path refinement profiles focus the user's attention more effectively by limiting the total amount of information presented at one time, and by providing abstraction techniques for ignoring uninteresting program structure details. Repeated refinement allows the user to selectively pursue optimization opportunities in a significance-ordered fashion. By contrast, many prior art profilers present data on all functions or all calls, most of which are insignificant and should be presented only on request.

Extended call path refinements of the present invention provide abstraction because they allow the user to see the aggregated resource costs of sets of contextualized calls, suppressing the full details of how, for example, a function A is eventually called from some ancestor function B.

Another abstraction technique available in the CPPROF profiling tool implemented according to the present invention, provides the ability of function grouping which allows the user to explicitly define a named group of functions and to treat that group in the same fashion as any single function, allowing, for example, the ability to directly determine the entire cost of a datastructure implementation choice by grouping the functions which implement the operations. The entire cost is not always simply the sum of the costs of the individual functions in the group because their costs may overlap, for example, due to co-recursion.

In one embodiment of the present invention as will be seen, nested sequences of a downward call path profile are excluded from the profile when a) a procedure name appears more than once in the sequence, and b) other procedures follow the second appearance of the procedure name in that sequence. In another embodiment of the invention, nested sequences of procedures of an upward call path profile are excluded from that profile whenever a) a procedure name appears more than once in the sequence, and b) other procedures precede the first appearance of that procedure name in that sequence.

Once all call paths in the program have been identified, the call paths that consume the higher amount of the user-designated resource are targeted for further analysis and/or for a new call path profiling using a different resource. Particular procedures within resource-intensive call paths can be optimized within the context of those call paths to eliminate performance bottlenecks in the program. When new call path profiles for different resources are derived, those profiles allow a user to identify the root causes of particular performance bottlenecks. Hence, the different profiles point out to the user which procedures (in which context) should be optimized and with respect to which resources.

There are four types of call path refinement profiles according to this embodiment of the present invention:

An immediate, downward refinement profile for call path p reports the costs of all call paths of the form p @ (x), where x is a function.

An immediate, upward refinement profile for call path p reports the costs of all call paths of the form (x) @ p, where x is a function.

An extended, downward refinement profile for call path p reports the costs of all call paths of the form p @ ( . . . x), where x is a function.

An extended, upward refinement profile for call path p reports the costs of all call paths of the form (x . . . ) @ p, where x is a function.

In the CPPROF profiling tool, all refinement profiles are sorted into decreasing order of cost and thresholded by a user-controlled parameter, which threshold may also be set at zero.

Figure 12:
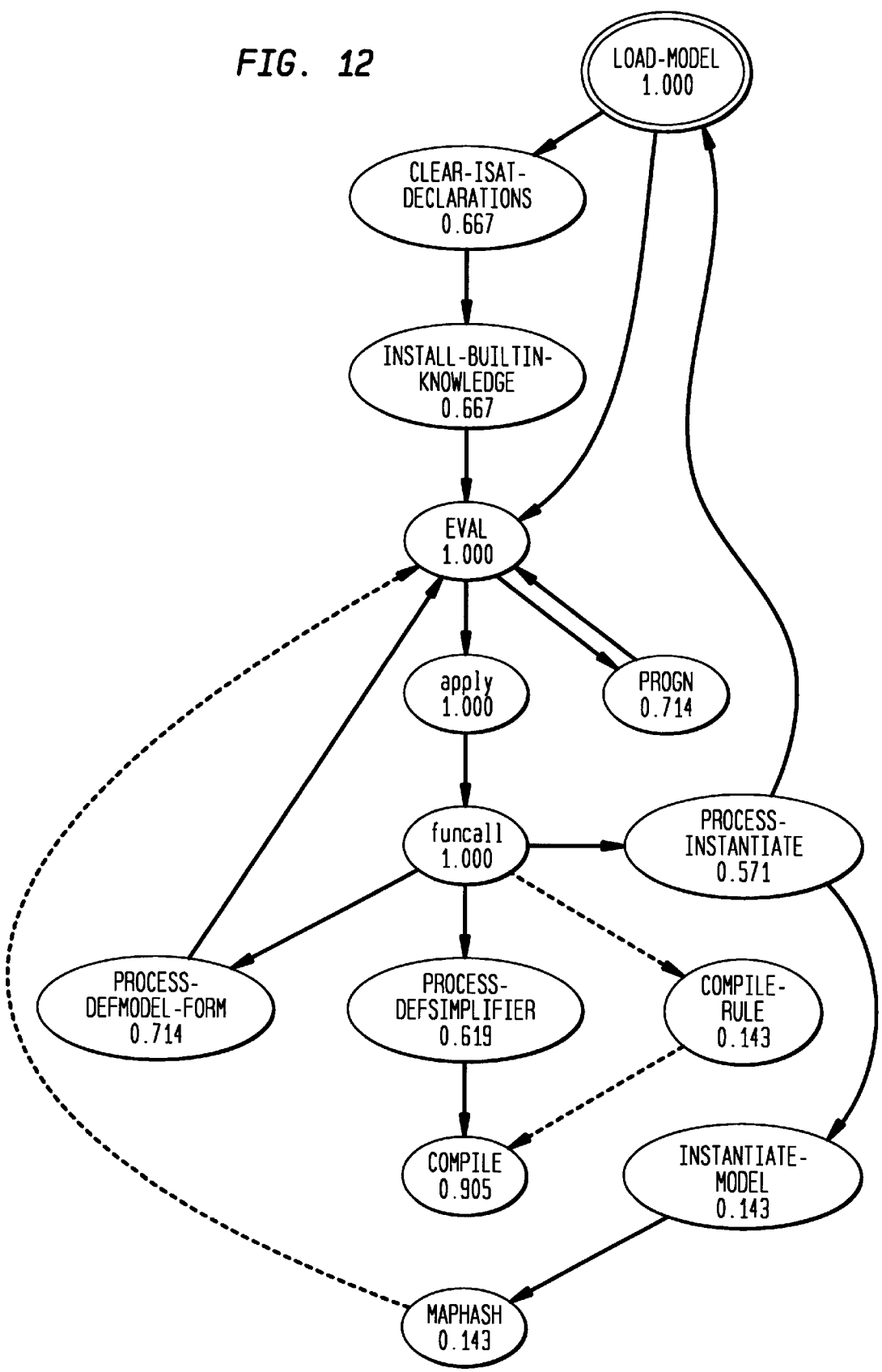
FIG. 12 is an abstracted call graph of the ISAT example program.

While there are many ways to approach a program using the four refinement profile types of the present invention, one methodology according to this embodiment of the present invention which is effective at focusing the search includes first examining the function profile and proceeding in order down the sorted list, then using first extended and, if necessary, immediate upward and downward refinement to investigate optimization opportunities. An abstracted call graph (such as shown in FIG. 12 below) is also useful in understanding performance, because it shows when two times may overlap.

Figure 9:
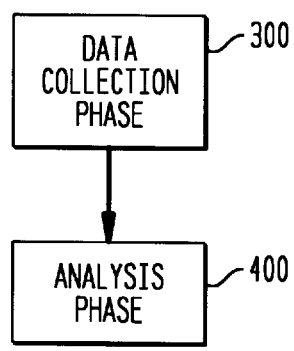
FIG. 9 illustrates a typical usage method of operation of CPPROF profiling of the present invention.

All four types of refinement profile of this embodiment of the present invention have been implemented within the CPPROF profiling tool. With reference to FIG. 9, profiling a program to be optimized (the "target program") under the present invention is divided into a two-step process including a data collection phase 300 and an analysis phase 400, with the two phases in communication with each other via a CPPROFDATA file. In an interactive language, such as Lisp, there is no need to write the data file unless the user wishes to save the data for later inspection. For non-interactive languages such as C, C++, or Fortran, the data file is necessary.

Figure 10:
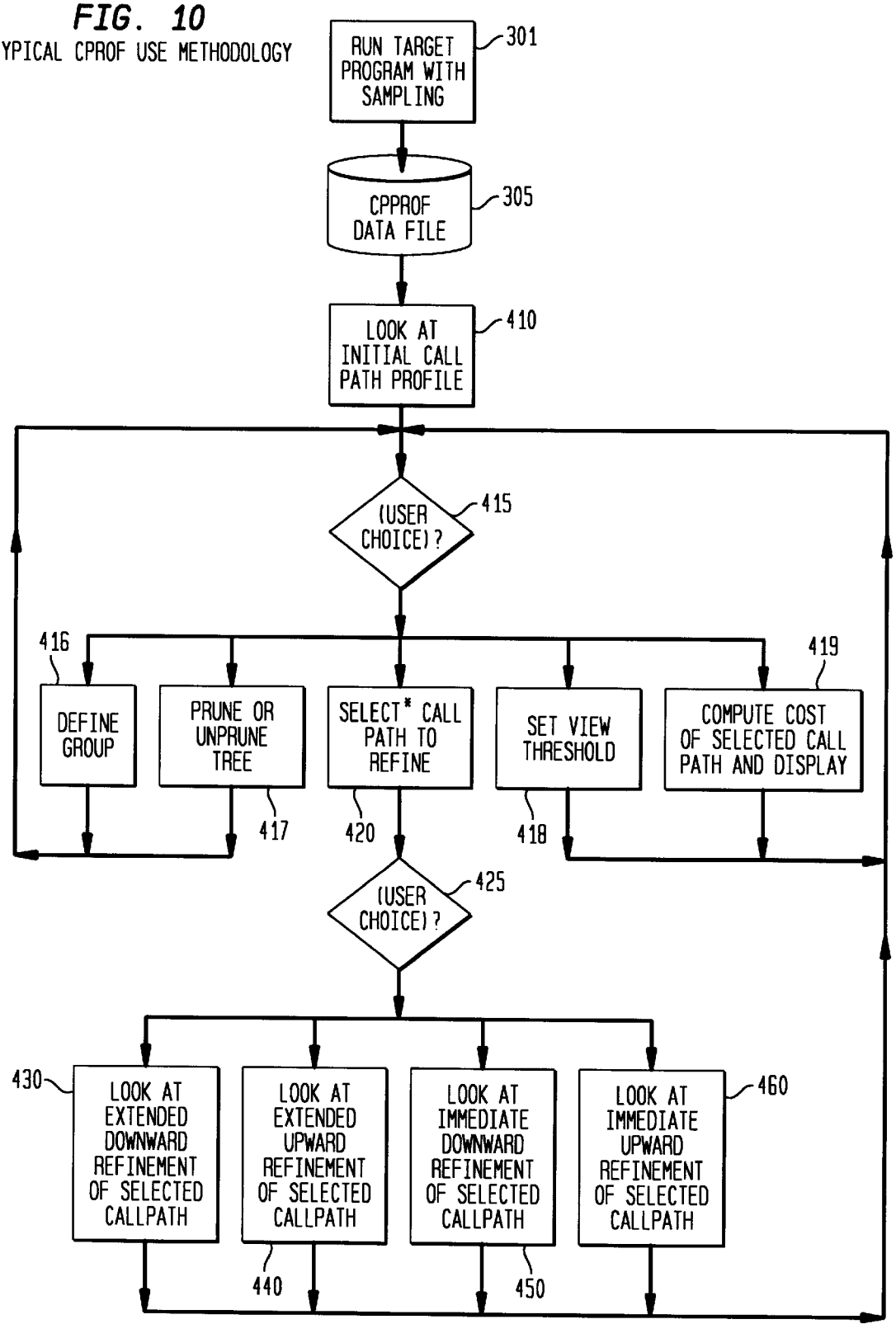
FIG. 10 illustrates the methodology of FIG. 9 in greater detail.

The following description is with reference to FIG. 10 which further details the CPPROF data collection and analysis phases according to this embodiment of the present invention.

For the data collection phase, there are two approaches to data collection: instrumentation and sampling. The instrumentation approach modifies the target program by adding data collection code to record cost data associated with each call site. Many prior art profilers are implemented in this fashion (e.g. the Plan 9 profiler, and Quantify).

In the data collection phase, in this embodiment, the target program is run under the control of a sampling process in 301 that periodically interrupts the program during run-time.

The sampling approach has a significant advantage over the instrumentation approach in that its relatively low overhead allows for minimal perturbation of the target program's normal behavior. CPPROF, under the sampling approach, periodically interrupts a run of the target program, each time recording the current stack trace and the allowing the program to proceed. The overhead (behavior perturbation) due to sampling can be made arbitrarily small by decreasing the frequency of sampling. Assuming enough samples are collected, the run-time cost of a stack trace is approximately proportional to the number of samples that occur when the trace or one of its extensions is executing.

The CPPROFDATA file is created in step 305. The output of the data collection phase, whether implemented by instrumentation or by sampling, is a collection of (stack trace, cost) pairs which are written to the CPPROFDATA file. In CPPROF, this information is written in an encoded form to save disk space.

The intermediate data file is semantically self-contained so the analyzer can operate on data collected from programs in any language for which the data collection phase is implemented. Versions of CPPROF's data collection routines have been built for several different programming environments.

An initial refinement is performed on the empty stack trace generating a function profile in 410.

Once the function profile is generated, the user enters the analysis phase. The user then invokes the CPPROF analysis component which, in this embodiment, is a programmable and interactive interpreter or command shell allowing the user to explore the program's performance by requesting the various types of refinement profiles of the present invention. This allows the user to compute costs and profiles of call paths, as well as to render abstracted call graphs decorated with profile information. In addition to refinement profiles, the user can request upward and downward profiles of an arbitrary call path.

In step 415 the user decides the first step of the analysis. Steps 416, 417, 418 and 419 are optional pre-refinement profiling steps, carried out to further refine the function profile prior to applying the call path refinement profiles of the present invention. In step 416 the user defines a function group for refinement. In 417 the user selects to prune or unprune a tree. In 418 the user will set a view threshold. In 419 the user can have the cost of a selected call path computed and displayed. The current profile is refined by the method chosen either in 416, 417, 418 or 419 and the process returns to step 415 for the user to decide whether to apply the call path refinement profiles or whether to undertake additional pre-profiling refinement.

After having performed the desired, if any, pre-profiling refinements, the user will select to continue with application of the call path refinement profiles of the present invention. In step 420 the user determines which call path is to be refined. In 425 the user will select which of the four call path refinement profiles of the present invention is to be run, either an extended downward 430, extended upward 440, immediate downward 450, or immediate upward 460 refinement profile. The entire refinement process is repeated (i.e., after 430, 440, 450 or 460, the program flow returns to 415) until optimization is complete.

The analysis phase according to the present embodiment will now be explained in greater detail.

The first step in the analysis phase is to build a more compact representation of the data collected in the data collection phase. This is done by building a stack (or sample) tree, which encodes how much time was spent in each stack trace. Essentially, each node of this tree is labeled by a function and has a numerical weight (see FIG. 13). This weight is proportional to the amount of time spent while the stack tree corresponding to the list of functions labeling the path from the root to the node was a prefix of the program's run-time stack. This data representation has the advantage of being more compact than a list of stack trace costs and it can be constructed from (stack trace, cost) pairs by calling ADD-TRACE on each pair in succession, starting from a one-node tree labeled by the root function. Pseudo-code according to the present embodiment for the ADD-TRACE routine is illustrated in FIG. 20.

The utility find-or-make-child takes a stack tree node and a function label and returns any unique existing child of the node labeled by the given label, or else allocates a new child, labels it, enters it into the stack tree, and returns it.

Figure 13:
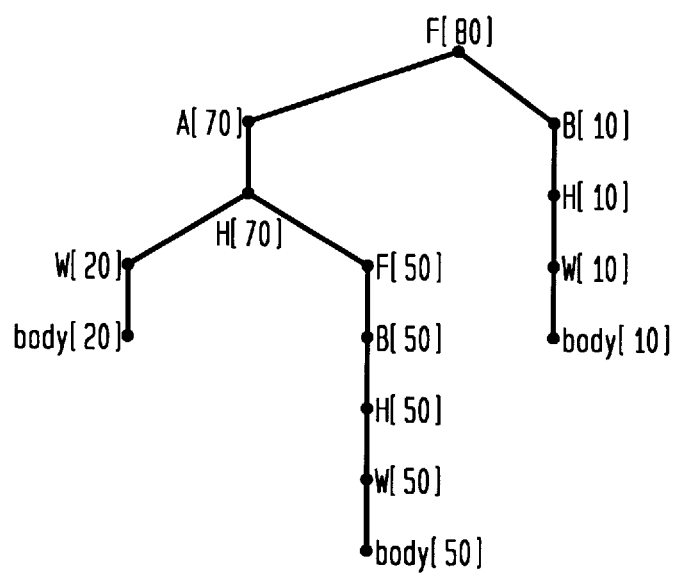
FIG. 13 is a stack tree profile of the program of FIG. 11.

For sampled data, according to one embodiment of the invention, ADD-TRACE is called on each sample paired with the sampling interval. The weight of a leaf is simply the sum of the costs of all pairs with stack trace equal to the path from root to that leaf. The weight of an internal node is just the sum of the weights of its children. FIG. 13 shows a stack tree for the program of FIG. 11. It is notationally convenient to postpend each sample with the (fictitious) body routine before adding it to the stack tree. Thus, all leaves of this tree are labeled by body.

The "first key primitive" or crucial building block used as a foundation for computing a refinement profile is the routine MAP-CP. It takes a stack tree T, a call path P, and a function MAP-FN of one (stack tree node) input and no outputs. It applies MAP-FN to all maximal nodes in T that lie in D(P). A node lies in D(P) if the stack trace from root to the node is in D(P). Such a node is maximal if none of its ancestors lie in D(P). One embodiment of a pseudo-code definition of MAP-CP is given in FIG. 21.

The MAP-CP routine searches the tree T for maximal nodes by successively matching function i and i+1 of the argument call path P to a node label and the label of its child. As soon as it has searched deeply enough to match all calls in the call path, it invokes the MAP-FN. If the call path is of form $p_1$ @ ( ... ) @ $p_2$, then as soon as a node is reached that lies in $D(p_1)$, MAP-CP recurs on each of its children using $p_2$. The ellipsis suspends the constraint that the last function of $p_1$ call the first function of $p_2$ directly.

The time cost of MAP-CP (excluding time in MAP-FN) is proportional to the number of stack tree nodes not in D(P), plus the number of maximal nodes in D(P).

The procedure COST is a simple application of MAP-CP that computes the cost of a call path, and its pseudo code according to one embodiment of the present invention is shown in FIG. 22.

MAP-CP will not invoke the map function on a descendant of some other node on which it has invoked it because no descendant of a maximal node can be maximal. Thus, no cost will be counted twice. Moreover, as every stack trace incurring cost and lying in D(P) must lie under some maximal node in D(P), no cost due to call path P will be missed.

Procedure REF (another MAP-CP application) computes call path refinement profiles. Pseudo code for procedure REF according to one embodiment of the present invention is shown in FIG. 23.

init-function-records initializes symbol table fields in which costs are to be collected, and function-records-to-profile constructs the profile from this information. Since each refinement profile computes at most one entry corresponding to each function in the program, the costs can be stored in records associated with the function name. As a last step, function-records-to-profile can add each function name, either with or without ellipsis, depending upon EXTENDED?, to the refined call path before constructing the profile.

If the EXTENDED? flag is true, indicating the caller wants an extended refinement, then FUNCTION-COSTS computes for each function in the subtree its cost and adds it to the score field of the function's record. This is essentially equivalent to individually computing the cost of each call path of form p @ ( . . . x) except it requires only one tree walk instead of one for each x in the program. If EXTENDED? is false, then it must only count cost incurred when that function is immediately called by the REQUIRED-PARENT-LABEL, which is set to the last function in the call path P.

Pseudo-code for the function FUNCTION-COSTS used by REF is shown in FIG. 24.

If PARENT is NIL, corresponding to the case when REF's EXTENDED? flag is true, the FUNCTION-COSTS separately adds up the weights of all nodes labeled by each given function, except that when it first reaches a node for a given function, it locks the record while searching below that node, prohibiting adding cost for that function. This avoids counting overlapping costs twice. If PARENT is non-NIL, then FUNCTION-COSTS only adds to a function's score if the immediate parent of the current node is the last function on the call path to be refined (the "required parent label"). Again, locking is performed to avoid multiply attributing time.

Since all datastructure operations can be implemented in constant time, FUNCTION-COSTS requires time proportional to the number of nodes in its input tree. The time cost of REF itself is the time to initialize the function records plus the time to build the profile from the function records plus the time to map FUNCTION-COSTS over all the maximal nodes denoted by the call path. Initializing records and profile construction are linear in the number of distinct functions appearing in the stack tree, hence dominated by linear in the size of the stack tree. Moreover, no two distinct invocations of FUNCTION-COSTS touch the same tree node, because it is invoked once on each maximal node for the call path, and no node touched by MAP-CP is touched by FUNCTION-COSTS. Thus, the mapping time is dominated by the number of nodes in the stack tree. This shows that the entire run-time for REF is proportional to the size of the stack tree.

REF takes a stack tree argument and computes downward refinement profiles. Upward refinements can be computed by constructing a dual ("inverted") stack tree whose nodes represent the total cost incurred when the path from node to root is a suffix of the program's call stack. This can be constructed from the original stack samples by simply reversing each list before calling ADD-TRACE. The body subroutine becomes the root and each leaf is labeled by the former root function. One can then implement upward refinement by simply calling REF on the dual stack tree with the reversal of the call path, reversing the call paths in the resulting profile.

In practice, the stack tree is such a compact representation that even maintaining both the primary and the dual uses less space than simply storing all the samples.

FIG. 12 shows the abstracted call graph of a sample complex program taken directly from source code for the Interactive Specification Acquisition Tools (ISAT) system. ISAT is a rule-based design and programming environment for reactive systems. The LOAD-MODEL subroutine of the code builds an executable rule-based system model in memory by reading a definition from one or more source files. In particular, such definitions may include "instantiate" statements which involve first recursively loading another model and then renaming and recompiling its rules into the overall model being built. Instantiations may nest arbitrarily.

In this example, the ISAT function PROCESS-INSTANTIATE handles instantiation. An immediate, downward refinement of the length-1 call path (PROCESS-INSTANTIATE) reveals the usage of time by the program as illustrated in FIG. 14.

Three times as much time is consumed loading the submodels as in actually instantiating them. Therefore it would be more productive to look first at the efficiency of this recursive call to LOAD-MODEL in the context of being called by PROCESS-INSTANTIATE. By repeatedly refining the most costly entry, the following results shown in FIG. 15 are obtained.

Continuing refinement through application of extended refinement according to the present invention exposes a significant performance problem in that there is no need to compile the builtin knowledge when it is loaded into the submodels because the top-level model will compile it as well. These results are shown in FIG. 16. Because the program is recursive, the cost fractions may sum to more than 1, as the different entries may represent overlapping times.

From these results it is determined that run time may be reduced 38.1% by inhibiting compilation during submodel loading. As will be appreciated by one skilled in the art, the level of detail of information provided, as illustrated in this example, is more detailed and useful information than merely that "the program spent a lot of time in COMPILE" as prior art profiling would indicate.

Call path refinement has teased apart time spent there due to the recursive LOAD-MODEL calls from that due to the top-level call. While some time must be spent compiling, it is only compilation done while recursively loading the submodels (prior to their inclusion in the top-level model) that is redundant. Such detailed information is not readily obtained from other types of prior art profilers.

Other illustrative types of refinement according to the present invention include optimization of the program without knowing its history. For example, in the above sample program where there is no indication to begin with PROCESS-INSTANTIATE, optimization will begin with a refinement of empty call path ( ). Refinement of ( ) is called a function profile and is identical for all four types of refinement as leading and trailing ellipses do not change the denotation of a call path. Refinement in this example yields the result in FIG. 17.

This initial refinement simply shows the total cost of each function in the program. As can be seen in the example, more than 90% of the time is spent compiling. Focus is then directed toward compilation time to determine which function or functions spend the most time compiling, with the results of such refinement illustrated in FIG. 18.

The function INSTALL-BUILTIN-KNOWLEDGE can be seen as spending a large amount of time compiling. This function, as shown in FIG. 19, can then be refined immediately upward to determine how it is called (two intermediate steps are suppressed).

This refinement yields sufficient information to conclude that a significant cost is the unnecessary compilation of the builtin knowledge during instantiation.

The CPPROF profiler implemented according to the present invention provides for stack tree editing operations, including the ability to add virtual program structure to the stack tree, and the ability to prune out time spent either in or not-in given call paths. Virtual structure allows one to aggregate time due to several different functions. Thus, one can profile the cost of data structure implementation decisions (e.g., to determine how much time is spent in table operations where a table is implemented as an association list). One can also aggregate time spent in all methods on a generic function, or all operators on a class. This allows even better connection of profile information with design decisions. The data collection phase of CPPROF can be implemented to include in the CPPROFDATA file a list of group definition commands corresponding to certain linguistic constructs appearing in the source code that naturally correspond to groups, such as a group for all member functions of a C++class. This has, in fact, been implemented of C++data collection in CPPROF.

Pruning operations allow one to ignore portions of the test run that are deemed either unrepresentative or uninteresting. For example, one may be interested only in the steady-state behavior of the code, so pruning may be used to exclude time spent in initialization and finalization.

The refinement types of the present invention have been implemented in the CPPROF system. While the embodiment of refinement profiling of present invention described above focuses on real-time profiles for illustrative purposes, there is nothing about time measurement inherent to call path profiling. Any monotonically increasing program resource can be profiled, assuming a resource clock is available.

CPPROF, utilizing refinement profiles according to the present invention, can be used to profile various program resources including space allocation, page faults, system calls, traps, and cache misses in Lisp, C, Fortran, and C++programs. These other resources may be profiled in isolation, or the data from distinct resources may be combined into a single, seamlessly integrated data set.

FIG. 8, as indicated above, shows a workstation. The hardware depicted in FIG. 8 is used to illustrate implementation of this embodiment. The FIG. 8 workstation is comprised of a Direct Access Storage Device which contains file space, main memory, and instructions to derive the stack tree of FIG. 13 and the call path profiles illustrated in FIGS. 14–19.

Workstation 800, which may be implemented using, for example, a SUN® workstation includes a SUN® display monitor and a keyboard that can be used to display pre-stored data or to specify parameters for program execution. Memory space is allocated by workstation 800 immediately before the execution of instructions associated with data code 801, user's program 802, stack tree construction program 803, profile computation program 804. Memory space for Scratch-pad-type of use is also allocated to auxiliary storage area 806. Accordingly, the aforementioned elements are represented as memory maps in FIG. 8, while CPPROF data file 805 is represented as disk space.

Data collection code 801 comprises instructions that are included in, or linked to, the source code of user's program 802 to periodically interrupt execution of the user's program 802 to write a stack sample to data file 805. User's program 802 which contains the code whose performance bottlenecks are being identified, is arranged to call data collection code 801 to set up the interrupts. In this example, when more resource units (such as milliseconds) pass than a single sample boundary, the instructions cause a corresponding number of hits to be credited to the sample. This process of interrupting the program execution and recording sample hits continues until the user's program 802 terminates.

Stack tree construction program 803 stores a set of instructions whose execution in a processor causes a stack tree to be built. The stack sample comprises a list of a) the number of sample hits, b) the current program counter, c) the return address of the current stack frame, and d) the return address of the caller and of the caller's caller, etc., until the root procedure is reached. A nested sequence of calling and called procedures is derived by analyzing the program counter and return addresses and mapping them to their corresponding procedure names. Therefore, instructions in the stack tree construction program 803 a) trace for each procedure the hierarchial path of calling and called procedures up to the root of the program, and b) assigns cost consumption to each path based on the number of times a sequence of calling and called procedures within a path appear in the samples, using code for ADD-TRACE shown in FIG. 20.

Profile computation program 804 stores the instructions needed to derive a call path profile. An exemplary set of such instructions that may be used to derive call path refinement profiles according to the present invention is shown in FIG. 23. Those instructions work for arbitrarily recursive programs and for arbitrary choice of call path to be refined by the user. Included in profile computation program 804 is a separate output routine that takes the output of those instructions and formats the output for readability.

The profile computation program 804 also includes user interface management instructions that allow the user to a) specify via the keyboard of processor 800, for example, the type of profile desired b) identify the desired focus procedure and call path to be refined and c) set the threshold of resource consumption for the call paths to be included in the profile. Also facilities are provided for pruning, unpruning and for defining virtual function groups. Instructions for the display of the derived call path profile on the monitor of workstation 800 are also included in the profile computation program 804. Derived stack trees and call path profiles can be stored in auxiliary storage area 806.

It would be appreciated that the process of analyzing a call path profile can be divorced from the process of collecting data during the run of the user's program. These two processes can be carried out in separate computers as long as the data file 805 is transferred from one computer to the other.

The foregoing is an illustrative embodiment of this invention. Persons skilled in the art can easily conceive of alternative arrangements providing functionality similar to this embodiment without deviating from the fundamental principles or the scope of this invention.

I claim:

1. A method for measuring usage of at least one focus resource by a target program having a plurality of call paths, said target program having at least one procedure, comprising the steps of:

providing a call path profile containing a data list, in some predetermined order, of some subset, including a null set, of said plurality of call paths together with associated usage cost of said focus resource;

selecting a focus call path from said call path profile or from said plurality of call paths; and computing a refinement call path profile showing said usage of said focus resource by refinement call paths of said focus call path wherein said refinement call path profile is invoked by a user via a unique switch with said call path to be analyzed indicated by said focus call path.

2. The method of claim 1 wherein said computing said refinement call path profile shows said usage of said focus resource of a subset of said refinement call paths of said focus call path.

3. The method of claim 2 wherein said data collection phase comprises running said target program on said processor under control of a sampling process that periodically interrupts said program and a stack sample is generated and recorded.

4. The method of claim 2 wherein said data collection phase comprises instrumenting said target program by adding a data collection code as part of an instrumentation process, running said program on said processor, and recording data on said usage costs associated with each of at least one call site while said target program is running.

5. The method of claim 1 further comprising the step of defining a function group from said call paths in said call path profile which allows grouping of said call paths from said data list as said focus call path and computing said refinement call path profile on said focus call path.

6. The method of claim 5 wherein an initial call path profile is a function profile.

7. The method of claim 6 wherein said function profile is derived from refinement of an empty call path wherein all said function groups in said target program are identified along with their proportion of usage of said focus resource.

8. The method of claim 1 wherein said call path profile is derived by running said target program using a processor in a data collection phase during which information regarding said usage of said focus resource is collected and computing said call path profile containing said data list.

9. The method of claim 1 further comprising the step of pruning to exclude some of said data from said call path profile, or unpruning to restore some or all of said excluded data and computing said refinement call path profile on said pruned or unpruned call path profile.

10. The method of claim 1 further comprising the step of displaying said refinement call path profile.

11. The method of claim 1 further comprising the step of displaying a subset of said refinement call path profile.

12. The method of claim 1 where said refinement call path profile is sorted in decreasing order of said usage cost.

13. The method of claim 1 wherein the steps of selecting said focus call path and computing said refinement call path profile are iteratively repeated by a user until desired level of refinement has been attained.

14. The method of claim 1 wherein an initial call path profile is a function profile.

15. The method of claim 14 wherein said function profile is derived from refinement of an empty call path wherein all said procedures in said target program are identified along with their proportion of usage of said focus resource.

16. The method of claim 1 wherein said call path profile is derived by selecting said focus resource from a plurality of monotonic computer resources, running said target program and collecting data regarding usage of said focus resource, generating a stack tree and generating said call path profile from said stack tree.

17. The method of claim 1 wherein said computed refinement call path profile is merged into a previously computed said refinement call path profile so resulting computed refinement call path profile contains both newly computed and said previously computed information of said usage costs.

18. The method of claim 17 wherein said merged refinement call path profile is sorted in decreasing order of said usage costs of said focus call path.

19. The method of claim 1 wherein said refinement call path profile is an extended refinement profile, said extended refinement profile showing for each said refinement call path said focus resource usage along a summary of all said call paths starting with said focus call path and ending with a procedure or function group.

20. The method of claim 19 wherein said refinement call path profile is upward or downward relative to said focus call path.

21. The method of claim 20 wherein an initial call path profile is a function profile, said function profile is derived by selecting said focus resource from a plurality of monotonic computer resources, running said target program and collecting data regarding usage of said focus resource, generating a stack tree and generating said function profile from said stack tree, said extended upward refinement call path profile is computed by constructing a dual of said stack tree and computing said extended upward refinement call path profile from said dual stack tree.

22. The method of claim 1 wherein said refinement call path profile is an immediate refinement profile, said immediate refinement profile computing said focus resource usage one procedure or function group call level immediately upward or downward from said focus call path.

23. The method of claim 20 wherein said refinement call path profile is upward or downward relative to said focus call path.

24. The method of claim 23 wherein an initial call path profile is a function profile, said function profile is derived by selecting said focus resource from a plurality of monotonic computer resources, running said target program and collecting data regarding usage of said focus resource, generating a stack tree and generating said function profile from said stack tree, said immediate upward refinement call path profile is computed by constructing a dual of said stack tree and computing said immediate upward refinement call path profile from said dual stack tree.

25. The method of claim 1 wherein said focus resource is selected from a plurality of monotonic computer resources.

26. A method for measuring usage of a focus resource by a target program having a plurality of call paths, said target program having at least one procedure, comprising the steps of:

providing a call path profile containing a data list, in some predetermined order, of some subset of said plurality of call paths together with associated usage cost of said focus resource;

selecting a focus call path from said call path profile; and computing a refinement call path profile showing said usage of said focus resource by refinement call paths of said focus call path by applying an extended refinement profile, said extended refinement profile invoked by a user via a unique switch with said user specifying said focus call path to be analyzed, said extended refinement profile showing for each said refinement call path said focus resource usage along a summary of all said call paths starting with said focus call path and ending with a procedure or function group.

27. The method of claim 26 wherein said refinement call path profile is upward or downward relative to said focus call path.

28. A method for measuring usage of a focus resource by a target program having a plurality of call paths, said target program having at least one procedure, comprising the steps of:

providing a call path profile containing a data list, in some predetermined order, of some subset of said plurality of call paths together with associated usage cost of said focus resource;

selecting a focus call path from said call path profile; and computing a refinement call path profile showing said usage of said focus resource by refinement call paths of said focus call path by applying an immediate refinement profile, said immediate refinement profile invoked by a user via a unique switch with said call path to be analyzed indicated by said focus call path, said immediate refinement profile computing said focus resource usage one procedure or function group call level immediately upward or downward from said focus call path.

29. The method of claim 28 wherein said refinement call path profile is upward or downward relative to said focus call path.

30. A method for improving performance of a target program having a plurality of call paths, said target program having at least one procedure, said method comprising the steps of:

providing a call path profile containing a data list, in some predetermined order, of some subset of said plurality of call paths together with associated usage costs of a focus resource;

(a) selecting a focus call path from said call path profile or from said plurality of call paths;

(b) computing a refinement call path profile showing said usage of said focus resource by refinement call paths of said focus call path wherein said refinement call path profile is invoked by a user via a unique switch with said call path to be analyzed indicated by said focus call path;

(c) determining a bottleneck call path from said usage shown in said refinement call path profile; and (d) optimizing said bottleneck call path by changing code of said target program.

31. The method of claim 30 wherein steps (a)–(e) are iteratively repeated to further improve efficiency of said target program until either (1) desired efficiency is reached, or (2) no further improvements in efficiency can be achieved.

32. The method of claim 30 wherein said optimization step (e) is implemented by first modifying said target program wherein said procedures of said focus call path are rewritten into new procedure versions so that said new procedure versions are only called within a context specified in said focus call path, and then, said new procedure versions are refined using said steps (a)–(e).

33. A method for measuring and presenting information as to usage of a focus resource by a target program having a plurality of call paths, said target program having at least one procedure, comprising the steps of:

(a) running said target program using a processor in a data collection phase during which information regarding said usage of said focus resource is collected;

(b) computing a call path profile containing a data list of some subset of said plurality of call paths together with their resource usage costs, in some predetermined order;

(c) displaying said profile to a user;

(d) allowing said user to define a new function group of said call paths from said profile;

(e) allowing said user to exclude some of said data from said data list, or to restore some or all of said excluded data;

(f) allowing said user to specify one or more single call paths of said call path profile, computing said usage costs, and displaying said usage costs to said user;

(g) allowing said user to select a focus call path to be refined from said call path profile;

(h) computing a refinement profile showing usage of said focus resource via refinement call paths of said focus call path;

(i) displaying said refinement profile; and (j) allowing said user to return to said step (d), or terminating said method.

34. A system for measuring usage of at least one focus resource by a target program having a plurality of call paths, said target program having at least one procedure, comprising:

means for providing a call path profile containing a data list, in some predetermined order, of some subset, including a null set, of said plurality of call paths together with associated usage cost of said focus resource;

means for selecting a focus call path from said call path profile or from said plurality of call paths; and means for computing a refinement call path profile showing said usage of said focus resource by refinement call paths of said focus call path wherein said refinement call path profile is invoked by a user via a unique switch with said call path to be analyzed indicated by said focus call path.

35. A system for measuring usage of a focus resource by a target program having a plurality of call paths, said target program having at least one procedure, comprising the steps of:

means for providing a call path profile containing a data list, in some predetermined order, of some subset of said plurality of call paths together with associated usage cost of said focus resource;

means for selecting a focus call path from said call path profile; and means for computing a refinement call path profile showing said usage of said focus resource by refinement call paths of said focus call path by applying an extended refinement profile, said extended refinement profile invoked by a user via a unique switch with said user specifying said focus call path to be analyzed, said extended refinement profile showing for each said refinement call path said focus resource usage along a summary of all said call paths starting with said focus call path and ending with a procedure or function group.

36. The system of claim 35 wherein said refinement call path profile is upward or downward relative to said focus call path.

37. A system for measuring usage of a focus resource by a target program having a plurality of call paths, said target program having at least one procedure, comprising the steps of:

means for providing a call path profile containing a data list, in some predetermined order, of some subset of said plurality of call paths together with associated usage cost of said focus resource;

means for selecting a focus call path from said call path profile; and means for computing a refinement call path profile showing said usage of said focus resource by refinement call paths of said focus call path by applying an immediate refinement profile, said immediate refinement profile invoked by a user via a unique switch with said call path to be analyzed indicated by said focus call path, said immediate refinement profile computing said focus resource usage one procedure or function group call level immediately upward or downward from said focus call path.

38. The system of claim 37 wherein said refinement call path profile is upward or downward relative to said focus call path.

39. A system for improving performance of a target program having a plurality of call paths, said target program having at least one procedure, comprising the steps of:

(a) means for providing a call path profile containing a data list, in some predetermined order, of some subset of said plurality of call paths together with associated usage costs of a focus resource;

(b) means for selecting a focus call path from said call path profile or from said plurality of call paths;

(c) means for computing a refinement call path profile showing said usage of said focus resource by refinement call paths of said focus call path wherein said refinement call path profile is invoked by a user via a unique switch with said call path to be analyzed indicated by said focus call path;

(d) means for determining a bottleneck call path from said usage shown in said refinement call path profile; and (e) means for optimizing said bottleneck call path by changing code of said target program.

40. A system for measuring and presenting information as to usage of a focus resource by a target program having a plurality of call paths, said target program having at least one procedure, comprising the steps of:

(a) means for running said target program using a processor in a data collection phase during which information regarding said usage of said focus resource is collected;

(b) means for computing a call path profile containing a data list of some subset of said plurality of call paths together with their resource usage costs, in some predetermined order;

(c) means for displaying said profile to a user;

(d) means for defining a new function group of said call paths from said profile;

(e) means for excluding some of said data from said data list, or to restore some or all of said excluded data;

(f) means for specifying one or more single call paths of said call path profile, computing said usage costs, and displaying said usage costs to said user;

(g) means for selecting a focus call path to be refined from said call path profile;

(h) means for computing a refinement profile showing usage of said focus resource via refinement call paths of said focus call path;

(i) means for displaying said refinement profile; and (j) means for either returning to said step (d), or terminating operation of said system.

* * * * *